(12) United States Patent
Ungar et al.

(10) Patent No.: US 6,275,985 B1
(45) Date of Patent: Aug. 14, 2001

(54) METHOD AND APPARATUS FOR DEVELOPING AN APPLICATION THAT IMPLEMENTS GARBAGE COLLECTION EFFICIENTLY BY COMBINING PROXY OBJECTS WITH COMPILER SUPPORT

(75) Inventors: David M. Ungar, Palo Alto; Antero K. P. Taivalsaari, Cupertino, both of CA (US)

(73) Assignee: Sun Microsystems, Inc, Palo Alto, CA (US)

( * ) Notice: Subject to any disclaimer, the term of this patent is extended or adjusted under 35 U.S.C. 154(b) by 0 days.

(21) Appl. No.: 09/215,448

(22) Filed: Dec. 17, 1998

(51) Int. Cl.[7] .................................................. G06F 9/44
(52) U.S. Cl. ..................... 717/5; 717/2; 717/7; 717/8; 717/10
(58) Field of Search .................................. 717/2, 5, 7, 8, 717/10

(56) References Cited

U.S. PATENT DOCUMENTS

| 5,274,804 | 12/1993 | Jackson et al. | 395/600 |
| 5,903,900 | 5/1999 | Knippel et al. | 707/206 |
| 5,909,579 | 6/1999 | Agesen et al. | 395/704 |
| 5,960,087 | * 9/1999 | Tribble et al. | 717/5 |
| 6,138,238 | * 9/1999 | Scheifler | 713/200 |

OTHER PUBLICATIONS

"Java Virtual MAchine", J. Meyer et al. O'Reilly Press, pp. 114–128, Mar. 1997.*
"The Java Virtual MAchine Specification", T. Lindholm et al. Java Press, Chapters 3 and 7, Sep. 1996.*
"Java!", by T. Richey Chapters 1–14, Sep. 1995.*
ACM Sigplan Workshop on Intermediate Representations (IR '95) by James Gosling, 1995.*

* cited by examiner

*Primary Examiner*—Mark R. Powell
*Assistant Examiner*—Todd Ingberg
(74) *Attorney, Agent, or Firm*—Park, Vaughan & Fleming LLP

(57) ABSTRACT

One embodiment of the present invention provides a system that facilitates developing an application that implements garbage collection (such as a virtual machine) using a first compiler and then compiling the application with a second compiler that provides support for efficient garbage collection. The system operates by developing the application using a first compiler and proxy objects, so that during execution of the application, pointers within the system stack point indirectly to data objects through proxy objects. These proxy objects are used during the garbage collection process to identify data objects that are referenced by the pointers within the system stack. Next, the system provides a second compiler that produces stack maps that identify pointers in the system stack. This allows the garbage collection process to identify objects referenced by the pointers in the system stack without using proxy objects. The application is then compiled using the second compiler, so pointers in the system stack point directly to objects instead of pointing to the objects indirectly through proxy objects. This allows the application to run faster because it eliminates the extra indirection operations caused by proxy objects. Thus, the above-described system allows programmers to develop an application using proxy objects, while concurrently developing a second compiler that provides stack maps to support garbage collection. When the second compiler is completed the application can be compiled with the second compiler.

24 Claims, 6 Drawing Sheets

```
NEW_PROXY(VALUE);
VALUE(PROXY);
SET_VALUE(PROXY, VALUE);
FIND_ALL_PROXIES();
FREE_PROXY(PROXY);
```
FIG. 5
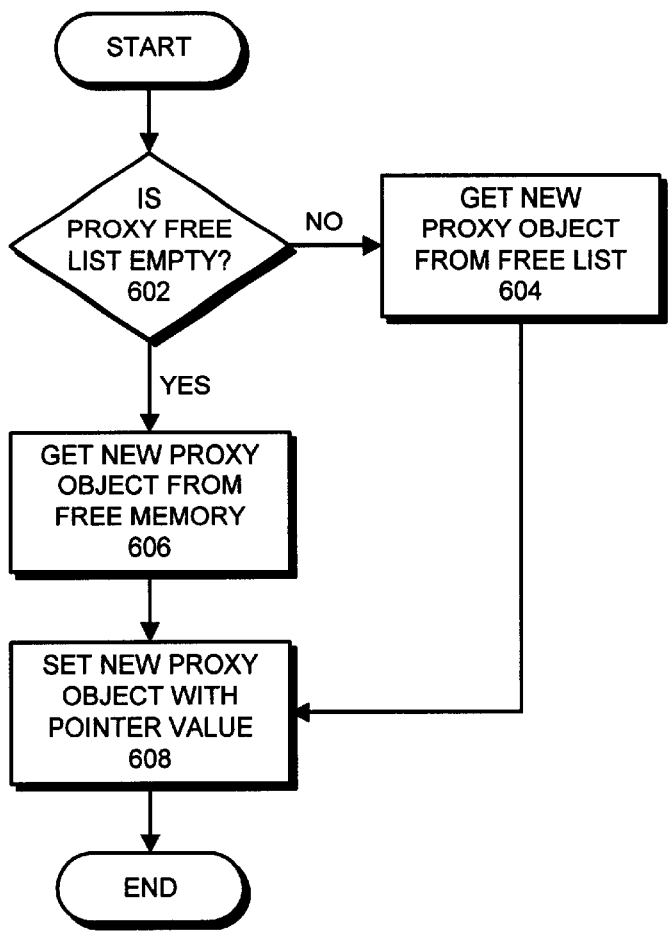
FIG. 6A
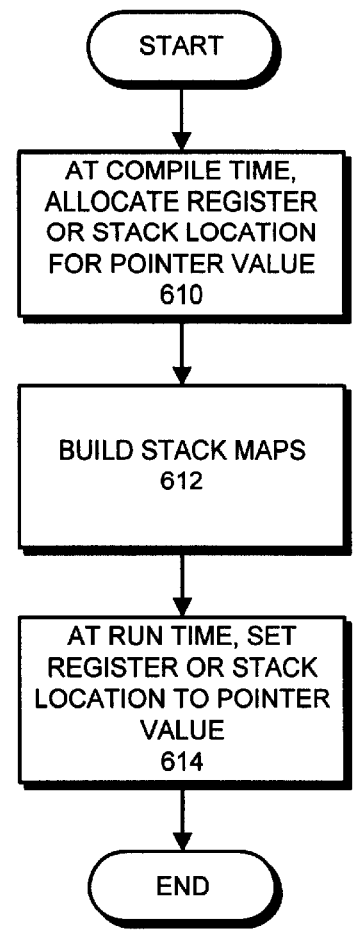
FIG. 6B

| | WITH PROXY OBJECT | WITHOUT PROXY OBJECT |
|---|---|---|
| VALUE(PROXY) | RETURN *PROXY | RETURN VALUE IN STACK LOCATION OR REGISTER |
| SET_VALUE(PROXY, VALUE) | *PROXY ← VALUE | SET STACK LOCATION OR REGISTER WITH VALUE |
| FIND_ALL_PROXIES(); | LOOK IN PROXY AREA FROM START TO FREE POINTER, IF WORD POINTS INSIDE APPLICATION HEAP AND IT IS NOT ON FREE LIST, RETURN ADDRESS OF WORD | TRAVERSE STACK, FOR EACH FRAME TRAVERSE STACK MAP AND RETURN LOCATIONS OF POINTERS |
| FREE_PROXY(PROXY); | IF PROXY IS AT FREE_PTR-1, DECREMENT FREE_PTR, ELSE THREAD PROXY ON FREE LIST | DO NOTHING |

FIG. 7

METHOD AND APPARATUS FOR DEVELOPING AN APPLICATION THAT IMPLEMENTS GARBAGE COLLECTION EFFICIENTLY BY COMBINING PROXY OBJECTS WITH COMPILER SUPPORT

BACKGROUND

1. Field of the Invention

The present invention relates to compilers and garbage collection in computer systems. More specifically, the present invention relates to a method and apparatus for developing an application using a first compiler and then compiling the application with a second compiler that provides support for efficient garbage collection.

2. Related Art

Programming languages with automatic memory management, such as the JAVA™ programming language from Sun Microsystems, Inc. of Palo Alto, Calif., are widely recognized for making software development easier. Unlike conventional programming languages, such as C or C++, that require programmers to use pointers and explicit memory allocation operations to manage dynamic data structures, languages such as the Java programming language take care of memory management automatically.

Automatic memory management systems typically allocate data objects from memory as they are needed during execution of a program. When memory objects are no longer being used by the program, they are typically reclaimed through a process known as "garbage collection."

Programming languages with automatic memory management relieve the programmer of the responsibility of explicitly managing memory, and this generally leads to better programming style. However, programming languages with automatic memory management also provide less control over memory allocation and pointer manipulation during program execution. This makes the behavior of the program harder to understand and predict. Furthermore, while languages with automatic memory management often provide reasonable performance in typical application programming tasks, in certain "systems programming" tasks involving time-critical system functions, the reduced control over memory management can cause performance problems. Programmers typically do not use programming languages with automatic memory management for systems programming tasks, but instead write systems programs using other, less elegant programming languages such as C or C++, which require explicit commands to allocate and deallocate memory.

One of the main performance problems for programs written in programming languages with automatic memory management is the garbage collection process. Garbage collection typically involves chasing down pointers in active data structures to determine which data objects are presently being referenced, so that the other data objects, which are no longer being referenced, can be reclaimed.

One problem in performing garbage collection is to identify objects in memory that are referenced by pointers on the system stack. One solution to this problem is to use proxy objects. Proxy objects are special system objects that point to data objects in memory. In order to use proxy objects, pointers on the system stack are modified so that they point to the proxy objects, which contain pointers to corresponding data objects in memory. This allows the garbage collection process to simply reference the proxy objects to determine which objects in memory are referenced by pointers in the stack. However, using proxy objects can be time-consuming and inefficient because a program that uses proxy objects must explicitly allocate and deallocate proxy objects, and must manipulate the proxy objects during references from the system stack.

Another solution to the problem of identifying objects referenced by the system stack is to modify a compiler so that it produces a "stack map" for each stack frame. A stack map identifies which items within a given stack frame contain pointers to objects in memory. This allows a garbage collection process to follow down the identified pointers in the system stack.

Unfortunately, many applications that implement garbage collections (such as virtual machines) have been developed using proxy objects, and these applications must be rewritten to take advantage of the performance advantages of stack maps. What is needed is a method and an apparatus that allows applications developed using proxy objects and a standard compiler to take advantage of the performance benefits of using compiler support to identify pointers within a system stack.

SUMMARY

One embodiment of the present invention provides a system that facilitates developing an application that implements garbage collection (such as a virtual machine) using a first compiler and then compiling the application with a second compiler that provides support for efficient garbage collection. The system operates by developing the application using a first compiler and proxy objects, so that during execution of the application, pointers within the system stack point indirectly to data objects through proxy objects. These proxy objects are used during the garbage collection process to identify data objects that are referenced by the pointers within the system stack. Next, the system provides a second compiler that produces stack maps that identify pointers in the system stack. This allows the garbage collection process to identify objects referenced by the pointers in the system stack without using proxy objects. The application is then compiled using the second compiler, so pointers in the system stack point directly to objects instead of pointing to the objects indirectly through proxy objects. This allows the application to run faster because it eliminates the extra indirection operations caused by proxy objects. Thus, the above-described system allows programmers to develop an application using proxy objects, while concurrently developing a second compiler that provides stack maps to support garbage collection. When the second compiler is completed the application can be compiled with the second compiler.

According to one aspect of the present invention, the application includes a virtual machine for executing platform-independent programs. According to another aspect of the present invention, the application manipulates proxy objects through a set of methods, including methods to allocate, free, set and retrieve a value from proxy objects. These methods are compiled by the first compiler into executable code that manipulates proxy objects, and are compiled by the second compiler into executable code that does not manipulate proxy objects, but instead uses stack maps and pointers within the stack to simulate the proxy objects.

BRIEF DESCRIPTION OF THE FIGURES

FIG. 5 illustrates a set of methods for manipulating proxy objects in accordance with an embodiment of the present invention.

FIG. 6A illustrates how a method to allocate a proxy object is implemented in accordance with an embodiment of the present invention.

FIG. 6B illustrates how a method to allocate a proxy object is implemented without actually allocating a proxy object in accordance with an embodiment of the present invention.

FIG. 7 is a table illustrating how various methods for manipulating proxy objects are implemented using proxy objects and without using proxy objects in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
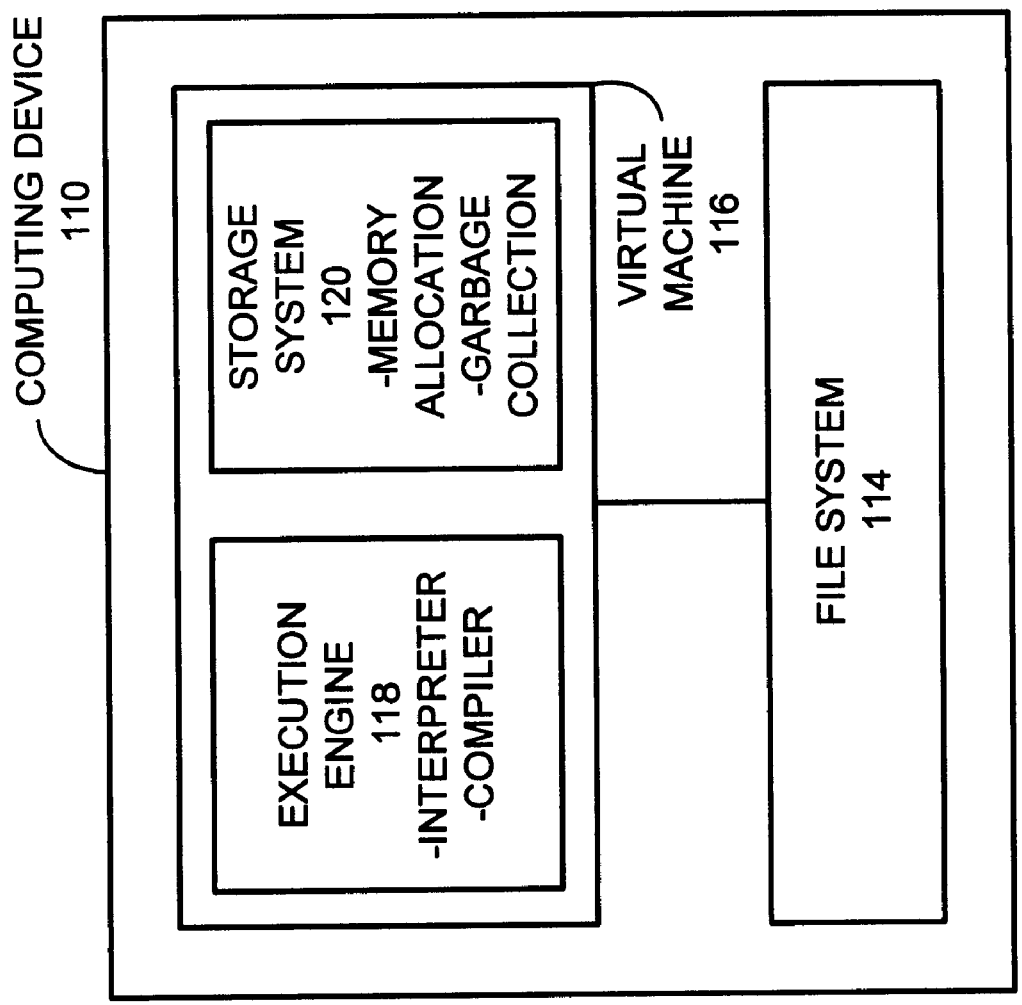
FIG. 1 illustrates a computing device including a virtual machine in accordance with an embodiment of the present invention.

FIG. 1 illustrates a computing device 110 including a virtual machine 116 in accordance with an embodiment of the present invention. Computing device 110 may include any type of computing device or system, including, but not limited to, a mainframe computer system, a server computer system, a personal computer, a workstation, a laptop computer system, a palm-sized computer system, a personal organizer, and a device controller. Computing device 110 may also include computing devices that are embedded in electrical/mechanical devices, systems or appliances, such as a pager, a cellular telephone, a television or an automobile.

Computing device 110 includes file system 114, for storing code and data, as well as a virtual machine 116 for processing platform-independent applications stored in file system 114. A platform-independent application is an application that can execute across a wide range of computing platforms. For example, an application written in the Java programming language is able to run across a wide range of computing platforms that include a virtual machine for executing the Java programming language.

Virtual machine 116 includes an execution engine 118 and a storage system 120. Execution engine 118 includes an interpreter and/or compiler for compiling and/or interpreting a platform-independent programming language, such as the Java programming language. Storage system 120 includes resources to perform memory allocation and garbage collection for applications running on virtual machine 116.

Note that although the present invention is described in the context of a virtual machine for running platform-independent programs, the present invention is not specific to virtual machines. Hence, the present invention can also be applied to other applications that perform garbage collection, but are not related to virtual machines.

Also note that this specification sometimes uses the term "application" to refer to particular types of applications that implement garbage collection. For example, one type of application that implements garbage collection is a virtual machine for running the Java programming language.

Compilers

Figure 2:
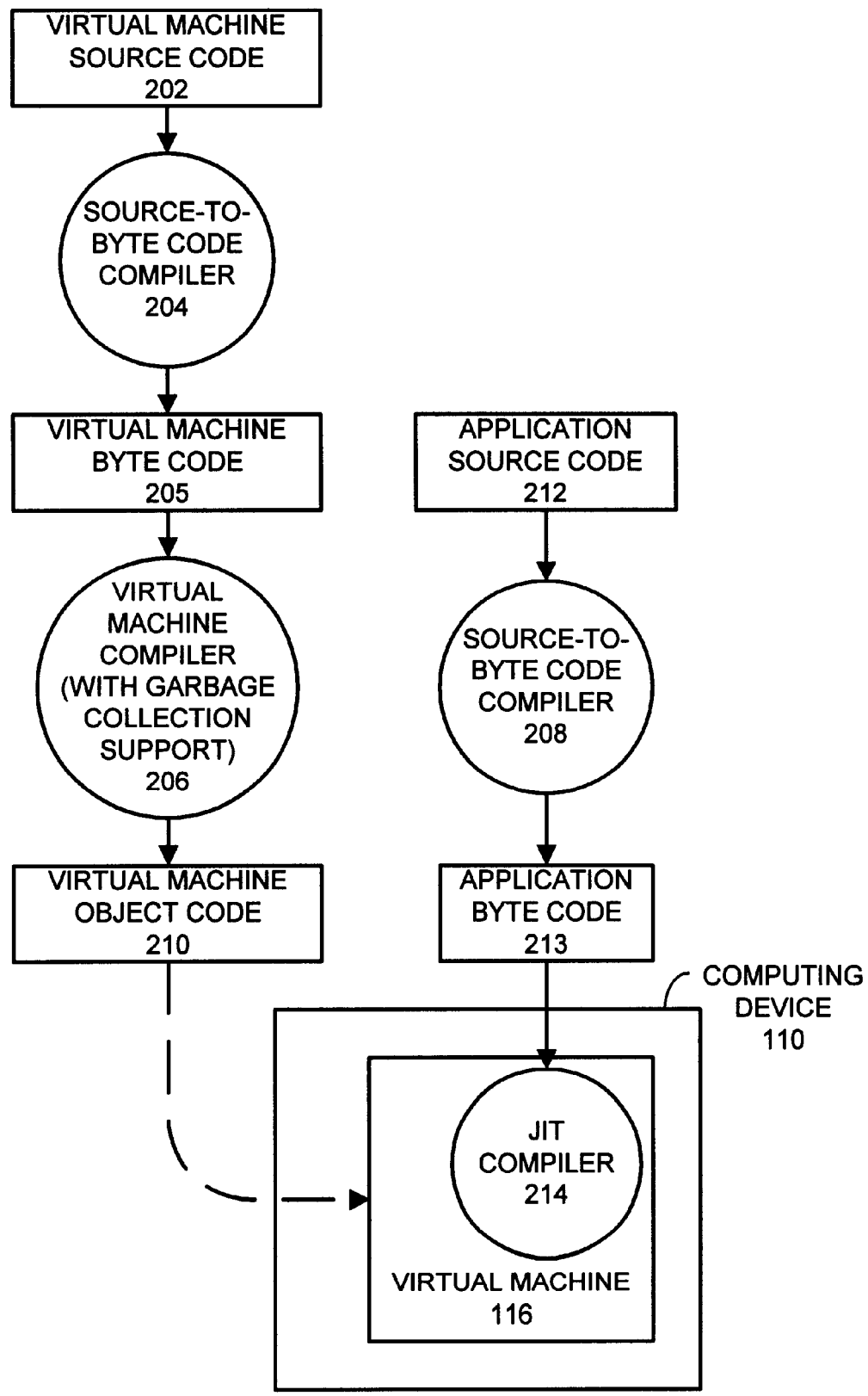
FIG. 2 illustrates how various compilers relate to the virtual machine in accordance with an embodiment of the present invention.

FIG. 2 illustrates how four different compilers relate to virtual machine 116 in accordance with an embodiment of the present invention. These compilers include source-to-byte code compiler 204, virtual machine compiler 206, source-to-byte code compiler 208 and JIT compiler 214.

Source-to-byte code compiler 204 receives virtual machine source code 202 as input and produces virtual machine byte code 205 as output. Virtual machine byte code 205 includes platform-independent byte codes, such as Java bytecodes, that are able to run on virtual machine 116 within computing device 110. Virtual machine compiler 206 receives virtual machine byte code 205 as input and produces virtual machine object code 210 as output. Virtual machine object code 210 executes on computing device 110 in order to carry out the functions of virtual machine 116. These functions involve facilitating execution of platform-independent programs such as application byte code 213.

Virtual machine source code 202 is a source code listing that may be written in any programming language. Because performance of virtual machine 116 is important, virtual machine source code is typically written in a programming language including explicit memory management operations, such as C or C++. However, in the embodiment illustrated in FIG. 2, virtual machine compiler 206 includes support for the garbage collection functions of an automatic memory system. This implies that virtual machine source code 202 is written in a language that supports automatic memory management. Virtual machine object code 210 contains executable native code for virtual machine 116 that can be run on computing device 110.

Source-to-byte code compiler 208 receives application source code 212 as input and compiles it into application byte code 213. Application source code 212 can be any program written in any high level language. For example, application source code 212 may include a word processor program or a spread sheet program written in the C programming language. Application byte code 213 includes platform-independent byte codes, such as Java bytecodes, that are able to run on virtual machine 116 within computing device 110. For example, if virtual machine 116 is a Java virtual machine and application byte code 213 contains Java bytecodes, then application byte code 213 can run on virtual machine 116 on computing device 110. Alternatively, application byte code 213 may run on any other computing platform that contains a corresponding Java virtual machine. Note that source-to-byte code compiler 204 may be the same compiler as source-to-byte code compiler 208.

Virtual machine 116 includes Just In Time compile (JIT compiler) 214. JIT compiler 214 compiles application byte code 213 into native executable code for computing device 110 and then executes the native executable code. In this way, application byte code 213 is converted into native code that can be executed by computing device 110.

Note that within FIG. 2, the present invention is primarily concerned with how virtual machine compiler 206 provides garbage collection support for virtual machine 116.

Proxy Objects and Stack Maps

Figure 3:
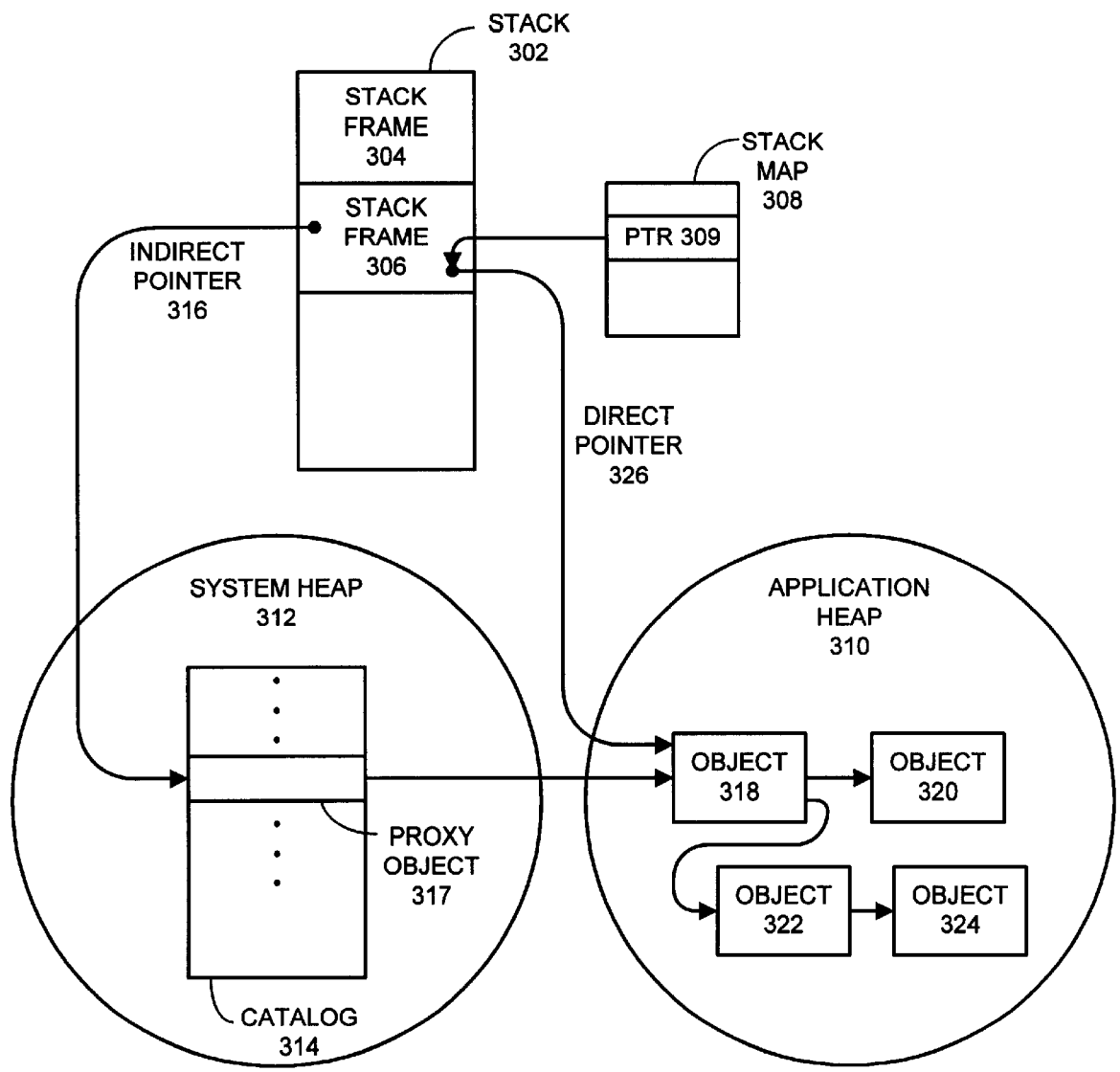
FIG. 3 illustrates how proxy objects and stack maps operate in accordance with an embodiment of the present invention.

FIG. 3 illustrates how proxy objects and stack maps operate in accordance with an embodiment of the present invention. FIG. 3 illustrates some of the memory structures involved in executing an application using virtual machine 116 within computing device 110 from FIG. 1. During execution of an application, virtual machine 116 maintains a stack 302 for the application as well as an application heap 310 and a system heap 312.

Stack 302 contains stack frames including variables and registers associated with method or function calls performed by the application. More specifically, stack 302 includes stack frames 304 and 306.

Application heap 310 includes memory for use by the application. Typically, execution of the application will cause a number of data objects to be allocated in application heap 310. In the example illustrated in FIG. 3, application heap 310 includes data objects 318, 320, 322 and 324. During garbage collection, the system must determine which data objects within application heap 310 are being referenced, and which data objects can be reclaimed. In order to do so, it must determine which data objects within application heap 310 are referenced by pointers within stack 302.

System heap 312 includes memory for use by the system that executes the application. Execution of the system causes a number of objects to be allocated and manipulated in system heap 312.

System heap 312 includes catalog 314, which contains proxy objects to help in the garbage collection process for application heap 310. For example, stack frame 306 includes indirect pointer 316, which points to proxy object 317 in catalog 314. Proxy object 317 itself points to object 318 in application heap 310. If all pointers within stack 302 are indirect pointers through proxy objects, such as indirect pointer 316, then a garbage collection process can simply scan through catalog 314 to identify which objects in application heap 310 are referred to by pointers in stack 302. Note that there exist many other ways to find all proxy objects besides using catalog 314. For example, in another embodiment of the present invention, proxy objects are threaded together into a list. However, in general, any technique for storing and referencing proxy objects may be used.

However, using proxy objects, such as proxy object 317, can impede system performance because the proxy objects must be allocated and de-allocated, and all references from the stack must pass through the proxy objects. Note that systems would run faster without the indirection created by proxy objects.

One technique to avoid this indirection is to use stack maps. Stack maps are data structures that allow the system to identify direct pointers on the stack that reference objects. In order to use stack maps, a compiler must be modified to produce a stack map. A stack map, such as stack map 308 in FIG. 3, stores information that allows a garbage collection process to determine which elements in a corresponding stack frame are references to objects in application heap 310. For example, in FIG. 3 stack map 308 includes pointer 309, which points to direct pointer 326 in stack frame 306. Direct pointer 326 is a reference to an object within application heap 310. The garbage collection process follows pointer 309 to direct pointer 326 into application heap 310 to determine that objects 318, 320, 322 and 324 are currently being referenced, and should not be reclaimed by the garbage collection process.

Process of Developing Application

Figure 4:
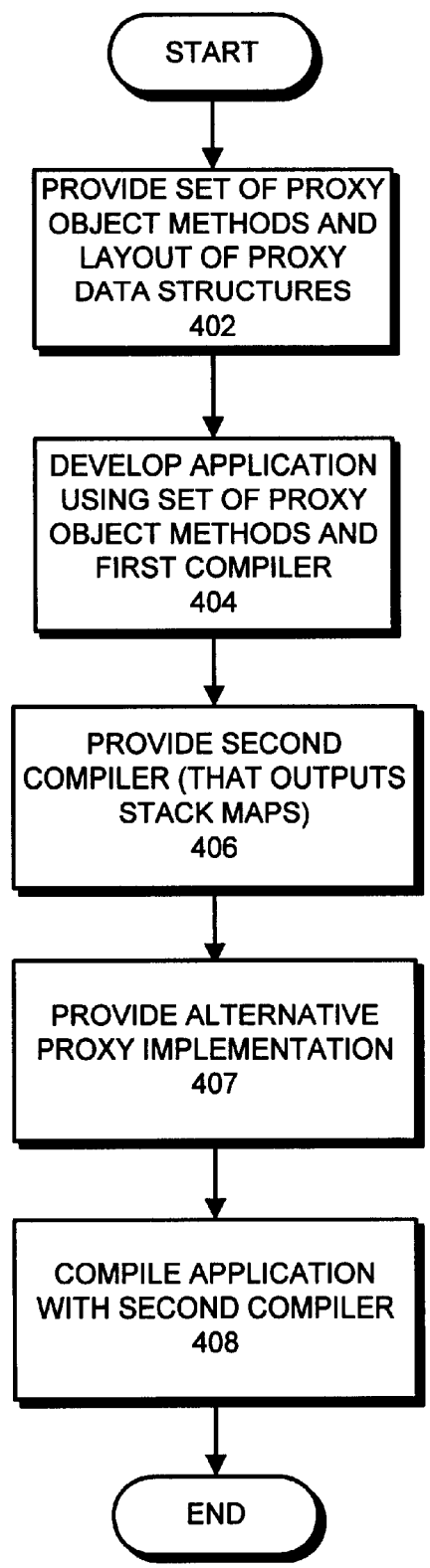
FIG. 4 is a flow chart illustrating how an application can be developed concurrently with a compiler that supports garbage collection for the application in accordance with an embodiment of the present invention.

FIG. 4 is a flow chart illustrating how an application can be developed concurrently with a compiler that supports garbage collection for the application in accordance with an embodiment of the present invention. In one embodiment of the present invention, this application is virtual machine 116 from FIG. 1.

First, a set of proxy object methods is provided as well as an initial layout of certain proxy object data structures (step 402). This set of proxy object methods allows a developer to write an application so that all references from the system stack pass through proxy objects. A garbage collection process can use these proxy objects to identify which objects are referenced by pointers on the system stack. Proxy object methods are described in more detail below with reference to FIGS. 5–7.

Next, the developer uses the proxy object methods and a first compiler to implement and test the application (step 404). This first compiler compiles the set of proxy object methods into code that allocates and manipulates proxy objects.

Next, a second compiler is provided that produces information that can be used to identify which elements in stack 302 reference objects in application heap 310 (step 406). In one embodiment of the present invention, the second compiler is developed at the same time the application is being developed in step 404.

Next, an alternative proxy object implementation is provided (step 407). This alternative implementation uses stack map 308 to manipulate direct pointers within stack frames, instead of allocation and manipulation actual proxy objects.

Finally, the application is compiled using the second compiler so that the proxy object methods are implemented using the alternative proxy object implementation (step 408).

The above described method allows an application, such as a virtual machine, that has been developed using proxy objects to be recompiled using the second compiler so that time-consuming proxy object manipulation operations are replaced by faster manipulations of direct pointers.

Note that the present invention uses two different implementations for proxy object methods. The first implementation allocates and manipulates real proxy objects, while the second implementation simply manipulates direct pointers within the stack. These alternative implementations are described below with reference to FIGS. 5–7.

Methods for Manipulating Proxy Objects

FIG. 5 illustrates a set of methods for manipulating proxy objects in accordance with an embodiment of the present invention. This set of methods includes new_proxy(value), value(proxy), set_value(proxy, value), find_all_proxies( ), and free_proxy(proxy). The method new_proxy(value) allocates a new proxy object, initializes the new proxy object with the input parameter "value," and returns a pointer to a new proxy object. The method value(proxy) returns a value within the proxy object. The method set_value(proxy, value) updates the contents of the proxy object with the input parameter "value." The method find_all_proxies( ) returns the proxy objects being used by the system one at a time during successive calls to find_all_proxies( ). Finally, the method free_proxy(proxy) deallocates a proxy object. Note that many different sets of methods can be used to allocate and manipulate proxy objects. Hence, the set of methods illustrated in FIG. 5 is not meant to limit the present invention to the particular set of methods illustrated.

FIG. 6A illustrates how the method new_proxy(value) is implemented in accordance with an embodiment of the present invention. In this embodiment, the method new_ proxy(value) actually allocates a proxy object. First, the method determines whether or not a proxy free list is empty (step 602). If not, the method gets a new proxy object from the free list (step 604). If so, the method gets a new proxy object from free memory (step 606). Note that the free list contains proxy objects that have been reclaimed by the garbage collection process. Finally, the new proxy object is set to a pointer value that points to an object in application heap 310 (step 608).

FIG. 6B illustrates how the method new_proxy(value) is implemented without actually allocating a proxy object in accordance with another embodiment of the present invention. At compile time, the compiler allocates a register or stack location for the pointer value (step 610). The compiler additionally creates a stack map 308 (step 612). The system can then use stack map 308 (and, if needed, a program counter into the function associated with the stack frame) to determine the register or stack location within the stack frame that contains the pointer value. When the method new_proxy(value) is called at run time, the method simply sets the allocated register or stack location with the input parameter "value" (step 614).

FIG. 7 is a table illustrating how other methods for manipulating proxy objects are implemented using proxy objects, and without using proxy objects, in accordance with an embodiment of the present invention. Each row of the table corresponds to a different method for manipulating proxy objects. Each column presents a different implementation for the set of methods. The left-hand column presents a first implementation of the set of methods using proxy objects, and the right-hand column presents a second implementation that does not use proxy objects.

The first row illustrates the method "value(proxy)," which returns the value within the proxy object. In the first implementation (first column), the method returns the value in the proxy object. In the second implementation (second column), the method returns the value in the stack location or register that has been allocated by the compiler to store the value.

The second row illustrates the method "set_value(proxy, value)," which sets the proxy object a particular value. In the first implementation, the proxy object is simply set to the value. In the second implementation, the stack location or register that has been allocated by the compiler to store the pointer value is set to the value.

The third row illustrates the method "find_all_proxies( )," which returns the proxy objects being used by the system one at a time during successive calls to find_all_proxies( ). In the first implementation, the method simply examines the proxy area from the start of the proxy area to the free pointer. If a word in the proxy area points inside application heap 310 and it is not on the free list, then the word is a valid proxy object and is hence returned. In the second implementation, the method traverses the stack. For each stack frame, the method traverses the stack map, and returns locations of pointers within the stack frame that are identified by the stack map.

Finally, the fourth row illustrates the method "free_proxy (proxy)," which deallocates a proxy object. In the first implementation, the method checks to see if the proxy is located immediately below the free pointer. If so, the free pointer can simply be decremented to free the proxy object. Otherwise, the proxy object is threaded onto the free list. In the second implementation, it is not necessary to free the allocated stack or register location, so the system does nothing.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for developing a virtual machine using a first compiler and then compiling the virtual machine with a second compiler that provides direct support for garbage collection, the method comprising:

providing a set of proxy object methods defining operations on proxy objects, the proxy objects being used to identify data objects that are referenced by pointers in a system stack for purposes of garbage collection;

developing the virtual machine using the set of proxy object methods and the first compiler, so that during execution of the virtual machine, pointers in the system stack point indirectly to the data objects through the proxy objects;

wherein the proxy objects contain pointers to the data objects, so that garbage collection operations can identify the data objects referenced by the pointers in the system stack by examining the proxy objects;

providing the second compiler that facilitates identifying data objects referenced by the pointers in the system stack without using proxy objects; and compiling the virtual machine using the second compiler, wherein compiling the virtual machine using the compiler includes creating a stack map, the stack map indicating which items within a stack frame in the system stack contain pointers to the data objects, so that during execution of the virtual machine, the pointers within the system stack point directly to the data objects without going through the proxy objects, and so that the set of proxy object methods manipulate the pointers within the system stack directly instead of manipulating the proxy objects.

2. A method for developing an application using a first compiler and then compiling the application with a second compiler that provides direct support for garbage collection, the method comprising:

developing the application using the first compiler, so that during execution of the application pointers within the system stack point indirectly to data objects through proxy objects;

wherein the proxy objects contain pointers to the data objects, so that garbage collection operations can identify the data objects referenced by the pointers within the system stack by examining the proxy objects;

developing a second compiler that facilitates identifying data objects referenced by the pointers in the system stack without using proxy objects; and compiling the application using the second compiler, wherein compiling the virtual machine using the second compiler includes creating a stack map, the stack map indicating which items within a stack frame in the system stack contain pointers to the data objects, so that during execution of the application, the pointers in the system stack point directly to the data objects without going through the proxy objects.

3. The method of claim 2, wherein the act of developing the application and the act of developing the second compiler take place concurrently.

4. The method of claim 2, wherein the application includes a virtual machine for executing platform-independent programs.

5. The method of claim 2, wherein the application includes a virtual machine for executing platform-independent programs, which are written in the Java programming language.

6. The method of claim 2, wherein the application includes a virtual machine, the virtual machine being written in the Java programming language.

7. The method of claim 2, wherein the set of proxy object methods includes a method to allocate a proxy object.

8. The method of claim 2, wherein the set of proxy object methods includes a method to free a proxy object.

9. The method of claim 2, wherein the set of proxy object methods includes a method to set a value in a proxy object.

10. The method of claim 2, wherein the set of proxy object methods includes a method to retrieve a value from a proxy object.

11. The method of claim 2, wherein the set of proxy object methods includes a method to locate proxy objects.

12. The method of claim 2, wherein compiling the virtual machine using the second compiler includes creating a stack map, the stack map indicating which items within a stack frame in the system stack contain pointers to the data objects.

13. An apparatus for developing an application with support for efficient garbage collection, comprising:
a first implementation of a set of proxy object methods defining operations on proxy objects, wherein pointers within a system stack point indirectly to data objects through the proxy objects, the proxy objects enabling garbage collection operations to identify data objects referenced by pointers in the system stack;
a first compiler that compiles the first implementation of the set of proxy object methods into methods that manipulate proxy objects;
a second implementation of the set of proxy object methods, to be used with the second compiler, the second implementation manipulating the pointers in the system stack instead of manipulating the proxy objects; and
a second compiler that supports garbage collection by facilitating identification of data objects referenced by the pointers within the system stack without using the proxy objects;
whereby the application can be developed with the first compiler using the first implementation of the set of proxy object methods, and the application can be subsequently compiled with the second compiler using the second implementation of the set of proxy object methods.

14. The apparatus of claim 13, wherein the application includes a virtual machine for executing platform-independent programs.

15. The apparatus of claim 13, wherein the application includes a virtual machine for executing platform-independent programs which are written in the Java programming language.

16. The apparatus of claim 13, wherein the application includes a virtual machine, the virtual machine being written in the Java programming language.

17. The apparatus of claim 13, wherein the set of proxy object methods includes a method to allocate a proxy object.

18. The apparatus of claim 13, wherein the set of proxy object methods includes a method to free a proxy object.

19. The apparatus of claim 13, wherein the set of proxy object methods includes a method to set a value in a proxy object.

20. The apparatus of claim 13, wherein the set of proxy object methods includes a method to retrieve a value from a proxy object.

21. The apparatus of claim 13, wherein the set of proxy object methods includes a method to locate proxy objects.

22. The apparatus of claim 13, wherein the second compiler includes a mechanism that creates a stack map, the stack map indicating which items within a stack frame in the system stack contain pointers to the data objects.

23. A method for developing an application, comprising:
producing source code to implement the application, the source code including commands to perform garbage collection through proxy objects, the proxy objects being manipulated through a set of methods;
compiling the source code into a first object code module using a first compiler, so that pointers within a system stack associated with the application point indirectly to data objects through the proxy objects;
testing the application by executing the first object code module; and
compiling the application into a second object code module using a second compiler, the second compiler including a mechanism that facilitates identifying data objects referenced by the pointers within the system stack without using the proxy objects, so that the set of methods defining operations on the proxy objects are implemented by manipulating the pointers on the system stack that point to the data objects directly.

24. A method for developing an application, comprising:
a means for producing source code to implement the application, the source code including commands to perform garbage collection through proxy objects, the proxy objects being manipulated through a set of methods;
a first compiling means for compiling the source code into a first object code module, so that pointers within a system stack point indirectly to data objects through the proxy objects;
a testing means for testing the application by executing the first object code module; and
a second compiling means for compiling the source code into a second object code module, the second compiling means including a mechanism that facilitates identifying data objects referenced by the pointers within the system stack without using the proxy objects, so that the set of methods defining operations on the proxy objects are implemented by manipulating the pointers on the system stack that point to the data objects directly.

* * * * *

UNITED STATES PATENT AND TRADEMARK OFFICE
CERTIFICATE OF CORRECTION

PATENT NO. : 6,275,985 B1
DATED : August 14, 2001
INVENTOR(S) : Ungar et al.

It is certified that error appears in the above-identified patent and that said Letters Patent is hereby corrected as shown below:

Please cancel claims 12 and 22.

Signed and Sealed this

Twenty-ninth Day of January, 2002

Attest:

Attesting Officer

JAMES E. ROGAN
*Director of the United States Patent and Trademark Office*